(12) United States Patent
Maier et al.

(10) Patent No.: US 8,200,387 B2
(45) Date of Patent: Jun. 12, 2012

(54) DEVICE AND METHOD FOR CONTROLLING A DRIVE UNIT

(75) Inventors: Stefan Maier, Regensburg (DE); Martin Prenninger, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 180 days.

(21) Appl. No.: 12/600,905

(22) PCT Filed: May 20, 2008

(86) PCT No.: PCT/EP2008/056151
§ 371 (c)(1),
(2), (4) Date: Apr. 19, 2010

(87) PCT Pub. No.: WO2008/142066
PCT Pub. Date: Nov. 27, 2008

(65) Prior Publication Data
US 2010/0198447 A1    Aug. 5, 2010

(30) Foreign Application Priority Data
May 21, 2007    (DE) .......................... 10 2007 023 553

(51) Int. Cl.
*G06F 19/00*    (2011.01)

(52) U.S. Cl. . 701/29.1; 701/70; 123/406.5; 123/406.51; 123/348; 123/435; 123/480; 180/291; 180/65.26; 180/65.27; 180/197; 60/601; 60/276; 60/277; 60/602; 60/612

(58) Field of Classification Search ............ 701/29, 701/70, 29.1; 123/406.5, 406.51, 348, 435, 123/480, 686, 568.11, 564, 339.19, 339.22, 123/585, 179.5, 476; 180/65, 291, 292, 65.26, 180/65.27, 197; 60/601, 276, 277, 602, 612, 314

See application file for complete search history.

(56) References Cited

U.S. PATENT DOCUMENTS
5,005,547 A  *  4/1991  Suga et al. ............... 123/406.26
(Continued)

FOREIGN PATENT DOCUMENTS
DE    19739564    3/1999
(Continued)

OTHER PUBLICATIONS
International Search Report with Written Opinion for Application No. PCT/EP2008/056151 (10 pages), Oct. 30, 2008.
(Continued)

*Primary Examiner* — James Trammell
*Assistant Examiner* — McDieunel Marc
(74) *Attorney, Agent, or Firm* — King & Spalding L.L.P.

(57) ABSTRACT

In a method for controlling the operation of an internal combustion engine, a target torque to be produced is determined in several steps: In a first step a torque requested by a user is determined and modified in subsequent steps by different functions, which reproduce the influences of at least one continuously determined working and/or operating parameter of the engine on the torque that is actually produced, in such a way that at the end of the steps the target torque required during the engine operation is defined and the engine operation and the determination of the working and/or operating parameter are monitored for errors. If errors occur, diagnostic values that describe or indicate the errors are generated and used to modify, in particular limit the target torque. The diagnostic values are individually assigned to the individual steps to modify the determination or modification of the torque performed in each step.

20 Claims, 2 Drawing Sheets

U.S. PATENT DOCUMENTS

| | | | | | |
|---|---|---|---|---|---|
| 5,199,394 | A | * | 4/1993 | Hartmann et al. | 123/179.1 |
| 5,381,768 | A | * | 1/1995 | Togai et al. | 123/587 |
| 5,540,204 | A | * | 7/1996 | Schnaibel et al. | 123/481 |
| 5,562,085 | A | * | 10/1996 | Kosuda et al. | 123/568.24 |
| 5,595,060 | A | * | 1/1997 | Togai et al. | 60/274 |
| 5,827,151 | A | * | 10/1998 | Sawamura et al. | 477/109 |
| 6,002,979 | A | * | 12/1999 | Ishizu | 701/86 |
| 6,026,921 | A | * | 2/2000 | Aoyama et al. | 180/65.25 |
| 6,086,510 | A | * | 7/2000 | Kadota | 477/107 |
| 6,223,721 | B1 | | 5/2001 | Bauer et al. | 123/399 |
| 6,474,299 | B1 | | 11/2002 | Langer | 123/352 |
| 6,863,051 | B2 | | 3/2005 | Doelker et al. | 123/352 |
| 7,593,796 | B2 | * | 9/2009 | Prokhorov | 701/29 |
| 2004/0093854 | A1 | | 5/2004 | Oakes et al. | 60/277 |

FOREIGN PATENT DOCUMENTS

| | | |
|---|---|---|
| DE | 19748745 | 5/1999 |
| DE | 19851457 | 2/2000 |
| DE | 102004055313 | 5/2006 |
| WO | 0202922 | 1/2002 |

OTHER PUBLICATIONS

German Office Action for Application No. 10 2007 023 553.6 (3 pages), Jan. 24, 2008.

Van Basshuyscn et. al., "Handbuch Verbrennungsmotor", Aug. 2, 2002, Vieweg Verlag, ISBN 3-528-13933-1, S. 554-556 (4 pages).

* cited by examiner

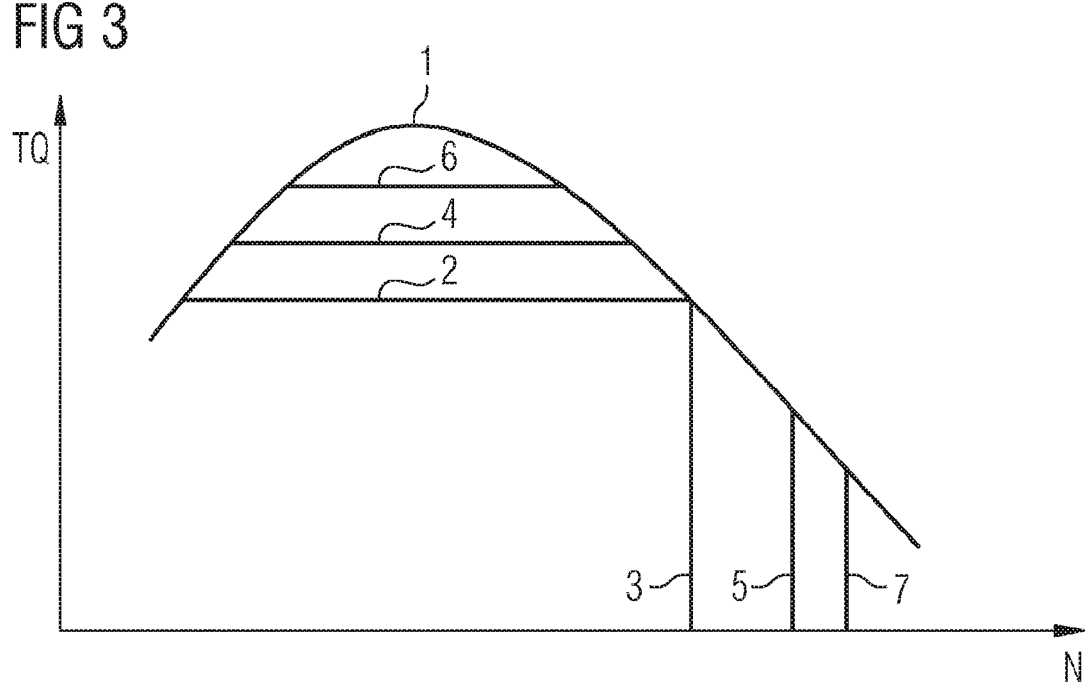
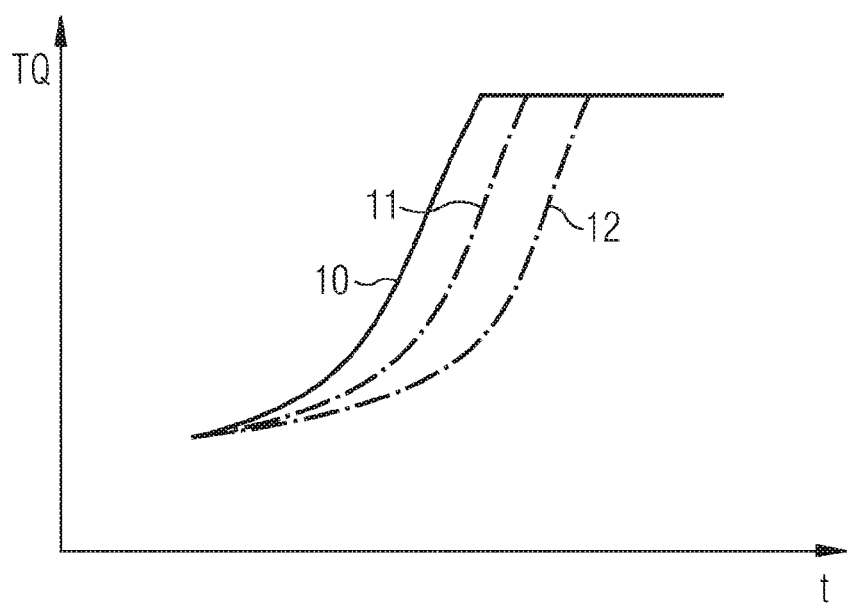

DEVICE AND METHOD FOR CONTROLLING A DRIVE UNIT

CROSS-REFERENCE TO RELATED APPLICATIONS

This application is a U.S. National Stage Application of International Application No. PCT/EP2008/056151 filed May 20, 2008, which designates the United States of America, and claims priority to German Application No. 10 2007 023 553.6 filed May 21, 2007, the contents of which are hereby incorporated by reference in their entirety.

TECHNICAL FIELD

The invention relates to a method for controlling the operation of an internal combustion engine, in particular an internal combustion engine powering a motor vehicle, wherein a target torque to be produced by the internal combustion engine is determined in a plurality of steps.

BACKGROUND

In a first step, a torque requested by a user is determined and modified in subsequent steps by different functions which reproduce the effects of at least one independently determined usage and/or operating parameter of the internal combustion engine on the torque actually produced by same, so that at the end of the sequence of steps the target torque required during the operation of the internal combustion engine is established and the operation of the internal combustion engine and the determination of the at least one usage and operating parameter are monitored for errors. If errors occur, diagnostic values describing or indicating said errors are generated and the diagnostic values are used to modify, in particular limit, the target torque.

In vehicles having internal combustion engines as drive units, the internal combustion engines are controlled by means of complex monitoring and control methods. For example, the driver's torque request as measured by the accelerator pedal position or rather its rate of change is taken into account in the control of the internal combustion engine.

For internal combustion engines in the prior art, a target torque is determined which the internal combustion engine must provide during operation. Particularly in the case of internal combustion engines used as the source of propulsion for a vehicle, this involves what is known as torque management, which comprises the steps described in the introduction. Once the target torque is established, it is implemented by means of fixed engine-type-dependent conversion into control variables, such as a quantity of fuel to be injected. The advantage of this approach is that individual characteristics of the internal combustion engine only need to be taken into account in the final step.

In addition, however, so-called diagnostic procedures are carried out which determine the state of usage and/or operating parameters of the internal combustion engine, such as the useful life of the motor oil, the exhaust gas properties, the engine speed, the cooling water temperature, etc. If on the basis of such a diagnostic procedure an operating situation of the internal combustion engine is detected which could be detrimental to the service life of the internal combustion engine, the exhaust gas behavior, the fuel consumption or taking other aspects into account, then on the basis of the diagnostic procedure the quantity of fuel injected into the internal combustion engine will be reduced. The same applies if an error occurs. Thus in many driving conditions a safety-relevant or even safety-critical situation may arise if, for example, reducing the quantity of fuel injected causes a reduction in engine speed or torque during an overtaking maneuver, resulting in less powerful acceleration or even deceleration of the vehicle. Since the driver of the vehicle does not expect the reduction in torque and is reliant on the availability of acceleration especially when overtaking, weaker acceleration may have safety implications.

Since sources of error are themselves mainly engine-specific, the prior art intervenes to take account of diagnosed problems or abnormalities only after the target torque has been determined. Said target torque is then suitably limited before it is converted into engine-specific control parameters, thereby ensuring that malfunctions or other prevailing circumstances are appropriately taken into account. One prevailing circumstance which has long been taken into account in this way is the sooting behavior of an internal combustion engine, particularly in the case of an internal combustion engine with internal mixture formation. Here the target torque, once determined using the above-mentioned steps, is possibly reduced such that the internal combustion engine has a desired exhaust gas behavior, in particular a desired particle or soot emission. Subsequent to such exhaust-gas-relevant limiting strategies, in the past more far-reaching prevailing circumstances were also taken into account, e.g. a maximum torque to be handled by a transmission downstream of the internal combustion engine, a maximum motor oil or cooling water temperature, etc., by suitably limiting the target torque determined using the steps described or if necessary reducing it.

However, this procedure may bring about the safety-critical situations likewise described in the introduction.

SUMMARY

According to various embodiments, a method of the type mentioned in the introduction can be further developed so as to reduce as far as possible safety-critical situations which can arise due to interventions in the target torque, or at least make them less likely, with continuous diagnosis of the operation of an internal combustion engine, as required e.g. according to statutory regulations for "onboard" diagnostics.

According to an embodiment, in a method for controlling the operation of an internal combustion engine, in particular an internal combustion engine powering a motor vehicle,—a target torque to be produced by the internal combustion engine is determined in a plurality of steps, wherein in a first step, a torque requested by a user is determined and modified in subsequent steps by different functions which reproduce the effects of at least one continuously determined usage and/or operating parameter of the internal combustion engine on the torque that is actually produced, such that at the end of the steps the target torque required during operation of the internal combustion engine is established, and—the operation of the internal combustion engine and the determination of the usage and/or operating parameters are monitored for errors and, if errors occur, diagnostic values that describe or indicate said errors are generated and the diagnostic values are used to change, in particular limit, the target torque, wherein the diagnostic values are individually assigned to the respective steps and are used during execution of the respective steps to change, in particular limit, the determination or modification of the torque effected in the respective step.

According to a further embodiment, the step-specific use of the diagnostic values can be organized as a function of the usage and/or operating parameter which is taken into account by the function of the relevant step. According to a further embodiment, the usage and/or operating parameter can be selected from the following group: speed of a vehicle powered by the internal combustion engine, engine speed, pedal value, gear of a transmission on the output side of the internal combustion engine. According to a further embodiment, using the diagnostic value may produce one or more of the following effects in the respective step: change in the maximum permissible torque, change in the maximum permissible engine speed, change in the permissible dynamic response of the torque, change in the permissible dynamic response of the engine speed. According to a further embodiment, to limit the maximum permissible dynamic response of the torque or of the engine speed, a filtering effect of the function of the respective step can be modified or disabled. According to a further embodiment, for maintenance work, data concerning the function affected by the use of the diagnostic value can be stored in an error memory.

BRIEF DESCRIPTION OF THE DRAWINGS

The invention will now be explained in greater detail with reference by way of example to the accompanying drawings, in which:

FIG. 3 shows a diagram in which the torque which can be developed by the internal combustion engine is plotted as a function of the engine speed, and FIG. 4 shows a diagram in which the torque which can be developed by the internal combustion engine is plotted as a function of time.

DETAILED DESCRIPTION

Figure 1:
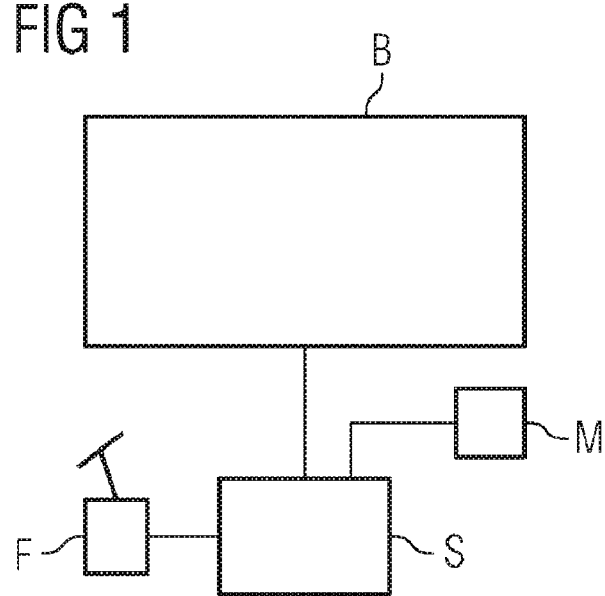
FIG. 1 shows a block diagram of an internal combustion engine.

According to various embodiments, in a method of the kind mentioned in the introduction, the diagnostic values are assigned individually to the respective steps and used to execute the relevant step for changing, in particular limiting, the torque determination or modification effected in the relevant step.

The limits or more specifically bounds therefore intervene precisely where the error in determining the target torque occurs. Another consequence of this is that the type of limiting can now be variable and step-specific. At the same time, any effects of the limits or bounds can be taken into account by executing the gentlest possible intervention by arranging it in a variable manner, thereby enabling the internal combustion engine or rather a vehicle equipped therewith to be kept reliably and optimally available. For example, it is possible to select a torque or engine speed limit as a function of the vehicle speed in a corresponding step. At the same time, limit redundancies which could occur for different steps, and were hitherto unavoidable in the case of general limiting after determination of the target torque, are avoided. Also, error-induced interventions only affecting convenience functions for the operation of the internal combustion engine can now be handled differently from error functions which intervene during steps that are relevant for the operational safety of the internal combustion engine.

If an error occurs, an optimum power reduction is therefore achieved by the error reaction intervening on a step-specific basis and thus remedying the actual physical fault in the function or remedying its effect. All this is achieved by the fact that the point of action of the fault reaction is selected depending on the type of error.

In particular, it is possible to make the step-specific use of the diagnostic values dependent on the usage and/or operating parameter which is taken into account by the function of the particular step in question, a possible usage and/or operating parameter being the speed of a vehicle powered by the internal combustion engine, a gear of a transmission on the output side of the internal combustion engine, etc.

Using the diagnostic value can have one or more of the following effects in the relevant step: changing the maximum permissible torque, changing the maximum permissible engine speed, changing the permissible dynamic response of the torque or engine speed. It is also possible for variable limits to be set, filter functions to be modified, ramp-like threshold values or limit values to be used, etc.

In particular, it is possible that, in order to limit the maximum permissible torque dynamic response, i.e. the maximum torque change per time unit that is permissible, or the maximum permissible engine speed dynamic response, a filter effect of the function of the relevant step is modified or even disabled. An example of this is what is known as load reversal correction which in the case of internal combustion engines is designed to prevent the torque from changing so abruptly that uneven operation of the internal combustion engine or rather an uncomfortable vehicle behavior occurs. If an error occurs, the corresponding filter can now be directly modified. Although the driver notices a changed vehicle behavior in this way, the torque requested by him can basically be provided, albeit with a different time response. In the event of an error, however, such load reversal or surge damping can also be disabled if functions or components essential for said function are affected.

Another example relates to limiting the available torque or permissible engine speed range differently as a function of different usage parameters such as gear selected, vehicle speed, etc.

Here it is particularly advantageous if each variable or function exhibiting an error is assigned a limit. This means that the function or variable which shows an error is also assigned the limit, resulting in limiting matched to the error pattern. This provides advantages in terms of safety. Thus, for example, if an error occurs in the vehicle speed, the limit will be proportional to the vehicle speed or the limiting can take place or be adjusted as a function of the vehicle speed. This also means that redundancies of limits in different functions are avoided.

It is also advantageous that the limits are taken into account directly in the target torque calculations in the respective steps or rather their function.

It is also advantageous if limiting is performed by filtering, by setting torque ramps and/or by setting variable torque setpoint values. For example, in the event of a load reversal correction error, the torque does not need to be limited, but advantageously only the filter can be modified.

For the internal combustion engine schematically illustrated in FIG. 1, the target torque is determined in a sequence of several steps. The internal combustion engine B is connected to a control unit S which controls the operation of the internal combustion engine and in doing so adjusts in particular the torque developed by the internal combustion engine B, which can be provided e.g. for powering a motor vehicle, to a predetermined target value. For determining the target torque, the control unit S takes into account primarily the position of an accelerator pedal F via which an operator of the internal combustion engine, e.g. a driver of the motor vehicle, implicitly specifies the desired torque in the form of a so-called driver request.

The control unit S is also connected via lines (not shown) to various sensors M which supply a large number of measured variables to the control unit S, e.g. the operating temperature of the internal combustion engine B, the latter's current speed, a turbocharger boost pressure, or operating parameters of various external units such as air conditioning, a drivetrain powered by the internal combustion engine, etc.

The control unit S performs torque management in order to determine the target torque to be developed by the internal combustion engine taking various influencing factors into account. Said influencing factors are control functions relating to various aspects of the internal combustion engine, e.g. at least one load reversal avoiding function, at least one exhaust gas quality influencing function, at least one surge damping function, etc. In the course of torque management, the control unit S first determines the torque demanded by the driver of the motor vehicle equipped with the internal combustion engine B. This is termed the driver request. The driver request constitutes an output variable for the target torque of the internal combustion engine; it is then modified taking various functions into account, each function possibly resulting in a change in the target torque in absolute value terms and/or in its time response. These functions can be, for example:

driver request interpretation;
load reversal prevention;
allowance for external torque take-offs;
torque loss determination;
drivability compensation, such as surge damping;
exhaust gas control functions.

The driver request is determined e.g. by means of the accelerator pedal F, it being detected how far and/or also how quickly the accelerator pedal F is depressed. On the basis of this information it can be determined in the driver request interpretation function whether the driver wants a high speed or acceleration.

The external torque take-off function comprises, for example, the connection of ancillary units such as an air-conditioning compressor or additional electrical or mechanical loads or the like. This reduces the torque remaining for propulsion and this function causes a corresponding slight increase in the target torque.

On the basis of the driver request, a control function is applied in various torque determination steps and the target torque is modified accordingly. When the steps have been executed, the target torque to be delivered by the internal combustion engine is established and is converted into corresponding control parameters which are then set on the internal combustion engine B by the control unit S. This ensures that, for each operating state, the internal combustion engine B delivers the torque which also corresponds to the driver request taking the effects of the current operating states into account. At the same time it also ensures compliance with any operating restrictions e.g. specified by exhaust gas requirements.

Figure 2:
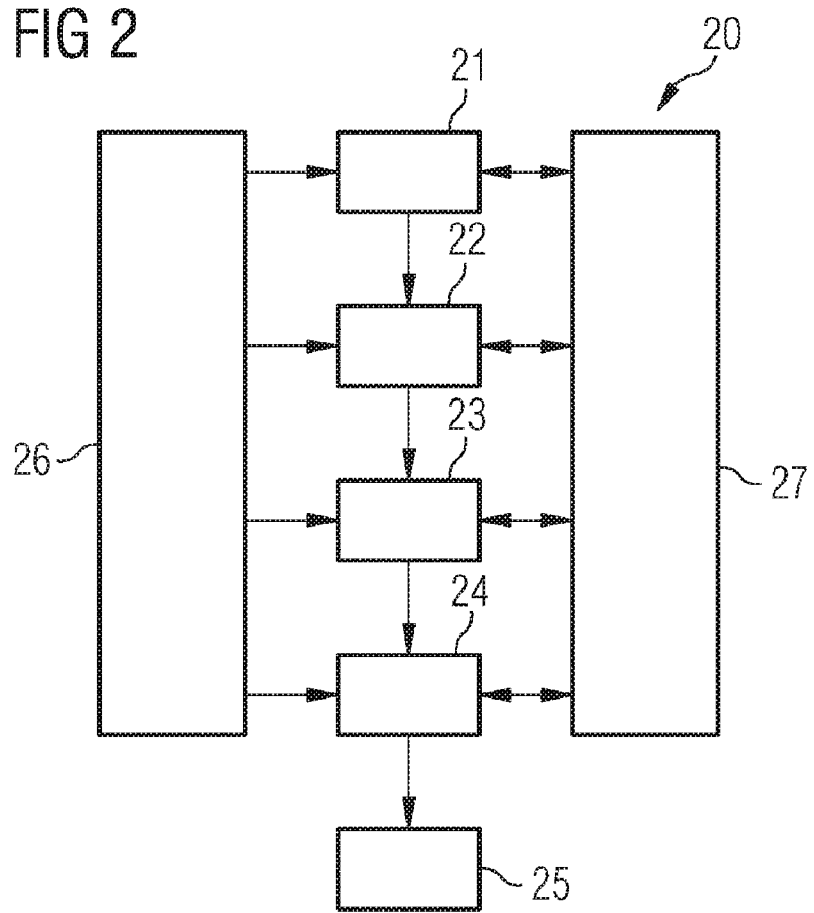
FIG. 2 shows a block diagram of a torque management system implemented in a control unit of the internal combustion engine of FIG. 1.

By way of explanation, FIG. 2 shows a block diagram 20 of the procedure. In step 21, a driver request calculation is performed. In step 22, a load reversal correction, for example, is carried out. In step 23, the effect of external torque interventions is calculated, and in step 24, drivability compensation such as surge damping is executed. Each of steps 21 to 24 modifies the target torque that is then available in step 25 and is converted into control parameters. However, all the blocks 21 to 24 are the subject of possible errors, which is symbolized by a block 26.

The internal combustion engine B is therefore, via the control unit S, also subject to diagnostics in which the state of the internal combustion engine B or rather of the functions influencing it is continuously determined on the basis of determined variables. For example, the exhaust gas behavior is monitored and a state is deemed to be present which may be adverse in terms of compliance with exhaust gas limit values. Various diagnostic values are determined here. The diagnostic value can be merely a qualitative indication as to whether an error is present, or also a quantification of the effect of the error. Determination of the respective diagnostic values is schematically incorporated in a block 27 and is known in principle in the prior art for internal combustion engines.

The double arrows between block 27 and the individual steps 21-24 indicate that the diagnostic values are now assigned or, as the case may be, must be assigned to the individual torque management steps.

The different diagnostic values thus assigned are taken into account in the corresponding torque management step, each step preferably being assigned a diagnostic value relating to an error associated with the respective function or rather influencing its effect on the target torque. The diagnostic values which are assigned to the individual steps are taken into account on a step-specific basis. Consequently, error diagnostics carried out for a function are used for the corresponding step in the determining of the target torque.

This enables, on the one hand, the diagnostic values to be evaluated and taken into account on a step-specific basis in determining the target torque. Any limits or effects on the target torque therefore intervene where the corresponding effect of the function on the target torque is calculated. In addition, the consequences of the diagnostic-value-induced intervention in an earlier step is automatically taken into account in the subsequent steps.

The internal combustion engine B or more specifically the vehicle equipped therewith is therefore kept optimally available. A much greater variety of diagnostic value effects can also be incorporated if they are introduced on a step-specific basis, as shown in the block diagram in FIG. 2. This applies particularly to a quantitative assessment of the diagnostic value, since the function affected by the particular error can be taken into account more precisely in the execution of its step during the calculation of the target torque than if the diagnostics were not taken into account until intervention in the already definitively calculated target torque, i.e. prior to step 25.

If, for example, a diagnostic error occurs in the driver request determining function (step 21 or 22), according to various embodiments, a driver request strategy used is modified by the control unit S such that the effect of said error on the driver request strategy is assessed and weighted. The result of this assessment affects whether and possibly how any target torque change limiting to be undertaken is carried out in this step.

If, for example, an error in the load reversal prevention function occurs (e.g. in determining engine speed and/or torque gradients) which makes load reversal prevention more difficult or impossible, target torque change limiting is if necessary carried out in the step for this function. Also in this case, the effect of the error on the load reversal determination to be performed can first be assessed and weighted. Depending on this assessment result, any limiting to be performed in the load reversal determination function is carried out.

It can be seen from these two examples that, in the event of an error, limiting of the torque and possibly of the speed of the internal combustion engine is no longer carried out at a particular point in the torque management sequence, but an assessment and possibly an introduction of limiting takes place in the individual functions in which an error has been detected or for which a detected error is relevant. The torque and/or speed limiting is therefore taken into account in the function for which an error has occurred. Torque target value determination therefore automatically also includes the taking into account of any error.

This means that, according to various embodiments, the limiting actions take effect where the torque target values are modified or determined.

The limiting can take place by limiting the change in the target torque and/or by limiting the target torque itself. For example, a possibly changed filtering, the setting of max. torque increases/decreases and/or setting of variable torque target values or limit values are possible.

In addition, the consequences of limiting or rather the limits can be taken into account, such as the limiting of a fuel injection quantity and/or a variable injection pattern in the event of an error. If e.g. during an overtaking maneuver it is detected that the limiting brings disadvantages, it can be decided to override or postpone the limiting.

As a result, an intervention of the error reactions in the various functionalities or strategies is carried out as a function of the diagnostic error.

FIG. 3 shows by way of example a diagram of how a diagnostic value from block 26 can be taken into account in step 22. In the diagram in FIG. 3, the torque TQ of the internal combustion engine B is represented as a function of its speed N. A curve 1 shows the response of the maximum available torque of the internal combustion engine B. As a function of the diagnostic value, both the torque TQ and the engine speed N are now limited by corresponding thresholds 2, 4, 6 for the torque TQ and 3, 5, 7 for the engine speed N, so that the torque range and the engine speed range are delimited. These bounds (here also termed limits) are in this example dependent on the vehicle speed (not shown). The higher the vehicle speed, the milder the bounding or rather limiting. At low vehicle speeds, e.g. the torque threshold 2 takes effect in combination with the engine speed threshold 3, so that the available torque TQ and the maximum engine speed N are within the thereby threshold-bounded region and higher values are not permitted. At average vehicle speeds, on the other hand, the torque threshold 4 is applied in combination with the engine speed threshold 5. Conversely, in the upper vehicle speed range, torques up to the torque threshold 6 and engine speeds up to the engine speed threshold 7 are permitted. A pure torque or engine speed threshold is obviously also possible.

FIG. 4 shows another example of step-specific taking into account of a diagnostic value, namely for load reversal damping in step 23. For this purpose the torque TQ of the internal combustion engine is plotted as a function of time t in curve 10. Said curve shows the unbounded permissible or possible time response of the torque TQ of the internal combustion engine B, i.e. a maximum increase which the target torque can/may execute. As can be seen, the curve 10 splits into a rising branch and a constant branch on which a further increase in the torque TQ over time is not possible, i.e. a saturation value is reached. Depending on the diagnostic value from block 27, other rate-of-rise behaviors for the torque TQ are now permitted, as represented by the dash-dotted curves 11 and 12. These curves correspond to a different time filter in the event of load reversal correction. They therefore produce a different effect of the function in step 23 on the target torque or of the time response.

What is claimed is:

1. A method for controlling an operation of an internal combustion engine comprising the steps of:
   determining, by a processor, a target torque to be produced by the internal combustion engine in a plurality of steps, wherein in a first step, a torque requested by a user is determined and modified in subsequent steps by different functions which reproduce the effects of at least one continuously determined usage and/or operating parameter of the internal combustion engine on the torque that is actually produced, such that at the end of the steps the target torque required during operation of the internal combustion engine is established,
   monitoring the operation of the internal combustion engine and the determination of the usage and/or operating parameters for errors and, if errors occur, diagnostic values that describe or indicate said errors are generated,
   using the diagnostic values to change the target torque, and
   assigning the diagnostic values individually to the respective steps and using the diagnostic values during execution of the respective steps to change the determination or modification of the torque effected in the respective step.

2. The method according to claim 1, wherein the step-specific use of the diagnostic values is organized as a function of the usage and/or operating parameter which is taken into account by the function of the relevant step.

3. The method according to claim 1, wherein the usage and/or operating parameter is selected from the following group: speed of a vehicle powered by the internal combustion engine, engine speed, pedal value, gear of a transmission on the output side of the internal combustion engine.

4. The method according to claim 1, wherein using the diagnostic value produces one or more of the following effects in the respective step: change in the maximum permissible torque, change in the maximum permissible engine speed, change in the permissible dynamic response of the torque, change in the permissible dynamic response of the engine speed.

5. The method according to claim 1, wherein, to limit the maximum permissible dynamic response of the torque or of the engine speed, a filtering effect of the function of the respective step is modified or disabled.

6. The method according to claim 1, wherein, for maintenance work, data concerning the function affected by the use of the diagnostic value is stored in an error memory.

7. The method according to claim 1, wherein the internal combustion engine powers a motor vehicle.

8. The method according to claim 1, wherein a change of the target torque is performed by limiting the target torque.

9. A method for controlling an operation of an internal combustion engine comprising the steps of:
   determining, by a processor, a target torque to be produced by the internal combustion engine in a plurality of steps, wherein in a first step, a torque requested by a user is determined and modified in subsequent steps by different functions which reproduce the effects of at least one continuously determined usage and/or operating parameter of the internal combustion engine on the torque that is actually produced, such that at the end of the steps the target torque required during operation of the internal combustion engine is established,
   monitoring the operation of the internal combustion engine and the determination of the usage and/or operating parameters for at least one error and, if an error occurs, generating at least one diagnostic value that describe or indicate said at least one error and assigning the at least one generated diagnostic value individually to a respective step in which the at least one diagnostic value is generated, and using the at least one generated diagnostic value to change the target torque during execution of the respective step to change the determination or modification of the torque effected in the respective step.

10. The method according to claim 9, wherein the step-specific use of the at least one diagnostic value is organized as a function of the usage and/or operating parameter which is taken into account by the function of the relevant step.

11. The method according to claim 9, wherein the usage and/or operating parameter is selected from the following group: speed of a vehicle powered by the internal combustion engine, engine speed, pedal value, gear of a transmission on the output side of the internal combustion engine.

12. The method according to claim 9, wherein using the at least one diagnostic value produces one or more of the following effects in the respective step: change in the maximum permissible torque, change in the maximum permissible engine speed, change in the permissible dynamic response of the torque, change in the permissible dynamic response of the engine speed.

13. The method according to claim 9, wherein, to limit the maximum permissible dynamic response of the torque or of the engine speed, a filtering effect of the function of the respective step is modified or disabled.

14. The method according to claim 9, wherein, for maintenance work, data concerning the function affected by the use of the diagnostic value is stored in an error memory.

15. The method according to claim 9, wherein the internal combustion engine powers a motor vehicle.

16. The method according to claim 9, wherein a change of the target torque is performed by limiting the target torque.

17. A system for controlling an operation of an internal combustion engine comprising:

means for determining a target torque to be produced by the internal combustion engine in a plurality of steps, wherein in a first step, a torque requested by a user is determined and modified in subsequent steps by different functions which reproduce the effects of at least one continuously determined usage and/or operating parameter of the internal combustion engine on the torque that is actually produced, such that at the end of the steps the target torque required during operation of the internal combustion engine is established, means for monitoring the operation of the internal combustion engine and for the determination of the usage and/or operating parameters for at least one error and, if an error occurs, the means generating at least one diagnostic value that describe or indicate said at least one error and assigning the at least one generated diagnostic value individually to a respective step in which the at least one diagnostic value is generated, and means for using the at least one generated diagnostic value to change the target torque during execution of the respective step to change the determination or modification of the torque effected in the respective step.

18. The system according to claim 17, wherein the step-specific use of the at least one diagnostic value is organized as a function of the usage and/or operating parameter which is taken into account by the function of the relevant step.

19. The system according to claim 17, wherein the usage and/or operating parameter is selected from the following group: speed of a vehicle powered by the internal combustion engine, engine speed, pedal value, gear of a transmission on the output side of the internal combustion engine.

20. The system according to claim 17, wherein using the at least one diagnostic value produces one or more of the following effects in the respective step: change in the maximum permissible torque, change in the maximum permissible engine speed, change in the permissible dynamic response of the torque, change in the permissible dynamic response of the engine speed.

* * * * *